United States Patent [19]

Maruichi et al.

[11] Patent Number: 5,469,211
[45] Date of Patent: Nov. 21, 1995

[54] VIDEO CAMERA

[75] Inventors: Takanori Maruichi, Chiba; Naoki Kamaya, Tokyo; Toshiyuki Yamauchi, Kanagawa, all of Japan

[73] Assignee: Sony Corporation, Tokyo, Japan

[21] Appl. No.: 238,580

[22] Filed: May 5, 1994

Related U.S. Application Data

[63] Continuation of Ser. No. 674,912, Mar. 26, 1991, abandoned.

[30] Foreign Application Priority Data

Mar. 29, 1990 [JP] Japan ........................................ 2-82243

[51] Int. Cl.$^6$ ...................................................... H04N 5/30
[52] U.S. Cl. ............................ 348/211; 348/372; 348/375
[58] Field of Search ..................................... 348/211, 371, 348/372, 373, 374, 375; 354/484, 67, 131; H04N 5/30

[56] References Cited

U.S. PATENT DOCUMENTS

| | | | |
|---|---|---|---|
| 4,499,504 | 2/1985 | Edakubo et al. | 348/374 |
| 4,924,246 | 5/1990 | Yamada | 354/126 |
| 4,928,179 | 5/1990 | Takahashi et al. | 348/211 |
| 4,952,967 | 8/1990 | Kazumi et al. | 354/442 |
| 4,984,090 | 1/1991 | Sasaki et al. | 358/229 |
| 5,068,683 | 11/1991 | Miyazaki | 354/484 |
| 5,132,800 | 7/1992 | Wada et al. | 358/209 |
| 5,151,727 | 9/1992 | Sasaki et al. | 348/372 |
| 5,189,520 | 2/1993 | Okayasu et al. | 358/229 |
| 5,281,990 | 1/1994 | Huang | 354/484 |
| 5,341,171 | 8/1994 | Mori et al. | 348/373 |

FOREIGN PATENT DOCUMENTS

| | | | |
|---|---|---|---|
| 235881 | 10/1987 | Japan | H04N 5/225 |
| 133267 | 6/1991 | Japan | H04N 5/225 |

Primary Examiner—Joseph Mancuso
Assistant Examiner—Bipin Shalwala
Attorney, Agent, or Firm—William S. Frommer; Alvin Sinderbrand

[57] ABSTRACT

A video camera has a body with a rear surface at which a battery unit is normally mounted, a remote control receiver has front and rear surfaces respectively mating with the rear and front surfaces of the camera body and battery unit, respectively, interengageable coupling devices at the front and rear surfaces of the remote control receiver and camera body and at the rear and front surfaces of the remote control receiver and battery unit, respectively, so that the battery unit can be mounted directly at the rear of the camera body or with the remote control receiver between the camera body and the battery unit.

6 Claims, 5 Drawing Sheets

VIDEO CAMERA

This application is a continuation of application Ser. No. 07/674,912, filed Mar. 26, 1991, now abandoned.

BACKGROUND OF THE INVENTION

1. Field of the Invention

This invention relates to a video camera to which there is removably attached a remote control receiver for the remote operation of the came by a remote control transmitter (commander).

2. Description of the Prior Art

A video camera is already known to which there is removably attached a remote control receiver for the remote operation of the camera, for example, by a remote control transmitter (commander). An example of such video cameras is shown in FIG. 5. the video camera generally denoted at 50 includes a camera body 51 having a shoe 52 for the mounting of an attachment provided on an upper face thereof. A remote control receiver 53 for the remote operation by way of infrared rays is removably attached to the shoe 52 so that remote operation of recording. reproduction and so forth of the video camera 50 can be performed by means of a wireless remote control transmitter (commander) 54.

Since the remote control receiver 53 for use with such conventional video camera 50 is removably attached to the shoe 52 provided for the mounting, on the upper face of the camera body 51, of other attachments, such as, a video light, and projects upwardly from the upper face of the camera body 51. the video camera 50 with the receiver 53 thereon feeds information to a regular user of the video camera 50 and the camera 50 does not have the feel of an integrated design.

Further, the remote control receiver 53 cannot be attached to a different video camera on which such shoe 52 is not provided on the upper face of the camera body 51.

SUMMARY OF THE INVENTION

It is an object of the present invention to provide a video camera on which a remote control receiver can be removably attached readily without the provision of a shoe for the mounting of an attachment.

It is another object of the present invention to provide a video camera which can feel to a user like an integrated design even when a remote control receiver is attached thereto.

In order to attain the objects, according to the present invention, there is provided a video camera which comprises a camera body with a rear surface on which, first battery receiving means are provided on the for removably mounting thereon a battery unit having front and rear surface from which a power to be supplied to the camera body, a remote control receiver configured to be interposed between the camera body and the battery unit and to be removably attached to the camera body by the first battery receiving means, second battery receiving means provided on the remote control receiver for removably mounting the battery unit thereon, and power supply means provided on the remote control receiver for supplying power from the battery unit to the remote control receiver and through the latter to the camera body.

With the video camera, the remote control receiver can be readily removably attached to the first battery mounting means provided on the camera body even where the camera body has no shoe for the mounting thereon of an attachment. Further, when a battery is attached to the second battery receiving section on the remote control receiver removably attached to the first battery mounting means on the camera body, power is supplied from the battery through the remote control receiver to the camera body by way of the power supply means. Further, the video camera according to the invention has an integrated feeling in that its appearance and configuration are not largely changed when inserting the remote control receiver between the camera body and the battery unit.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
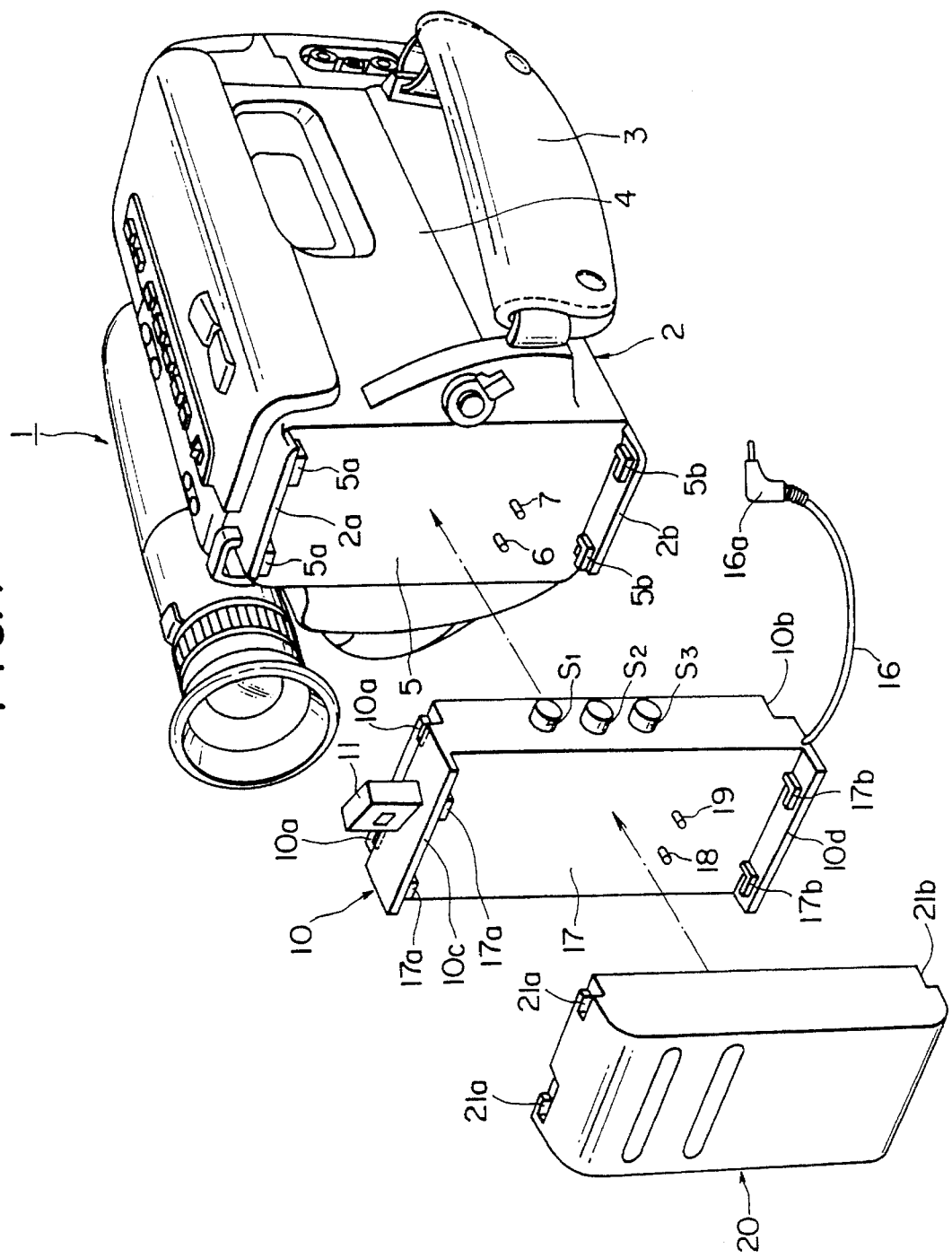
FIG. 1 is an exploded perspective view of a video camera showing a preferred embodiment of the present invention.
Figure 2:
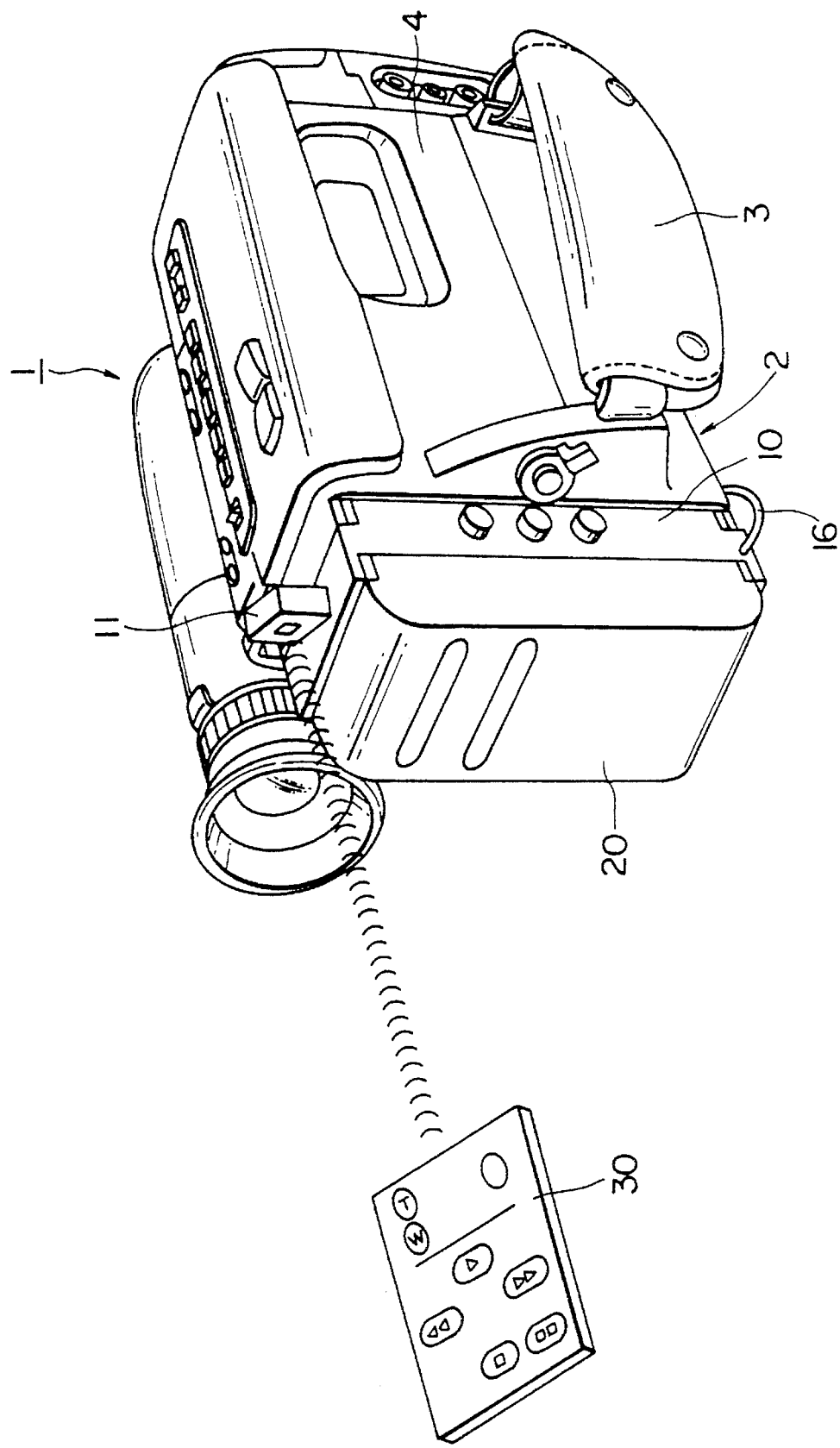
FIG. 2 is a perspective view showing the video camera of FIG. 1 in use.

Referring first to FIGS. 1 and 2, there is shown an 8 mm video camera to which the present invention is applied. The 8 mm video camera 1 is of the small size type wherein a side portion 4 of a video camera body 2 adjacent a grip section 3 is formed as a VTR deck section for driving a tape cassette (not shown) loaded therein. A rear portion surface of the camera body 2 is formed as a battery receiving section 5. The battery receiving section 5 includes pairs of hook-or L-shaped arresting portions 5a and 5b formed integrally on opposing inner faces of a pair of flange portions 2a and 2b which extend integrally and rearwardly from upper and lower edges of the camera body 2. The battery receiving section 5 further includes a positive terminal 6 and a negative terminal 7 in the form of pins secured to and extending rearwardly from a rear face of the camera body 2.

A remote control receiver 10 for the remote control of camera operation by means of infrared rays is removably attached to the battery receiving section 5. Pairs of L-shaped recessed engaging or coupling portions 10a and 10b are formed at corner portions of a front face of the remote control receiver 10 corresponding to the pairs of arresting portions 5a and 5b of the battery receiving section 5 of the camera body 2. Meanwhile, a pair of metal plates (not shown) in the form of springs are provided at locations of the front face of the remote control receiver 10 corresponding to the positive and negative terminals 6 and 7 of the battery receiving section 5 of the camera body 2. When the remote control receiver 10 is to be attached to or removed from the battery receiving section 5 of the camera body 2, the pairs of engaging portions 10a and 10b of the remote control receiver 10 are engaged with or disengaged from the pairs of arresting portions 5a and 5b of the battery receiving section 5. Accordingly, the remote control receiver 10 can be readily attached to or removed from the battery receiving section 5. It is to be noted that, when the remote control receiver 10 is attached to the battery receiving section 5 of the camera body 2, the pair of metal plates in the form of springs on the front face of the remote control receiver 10 are contacted with the positive and negative terminals 6 and 7 of the battery receiving section 5.

Figure 3:
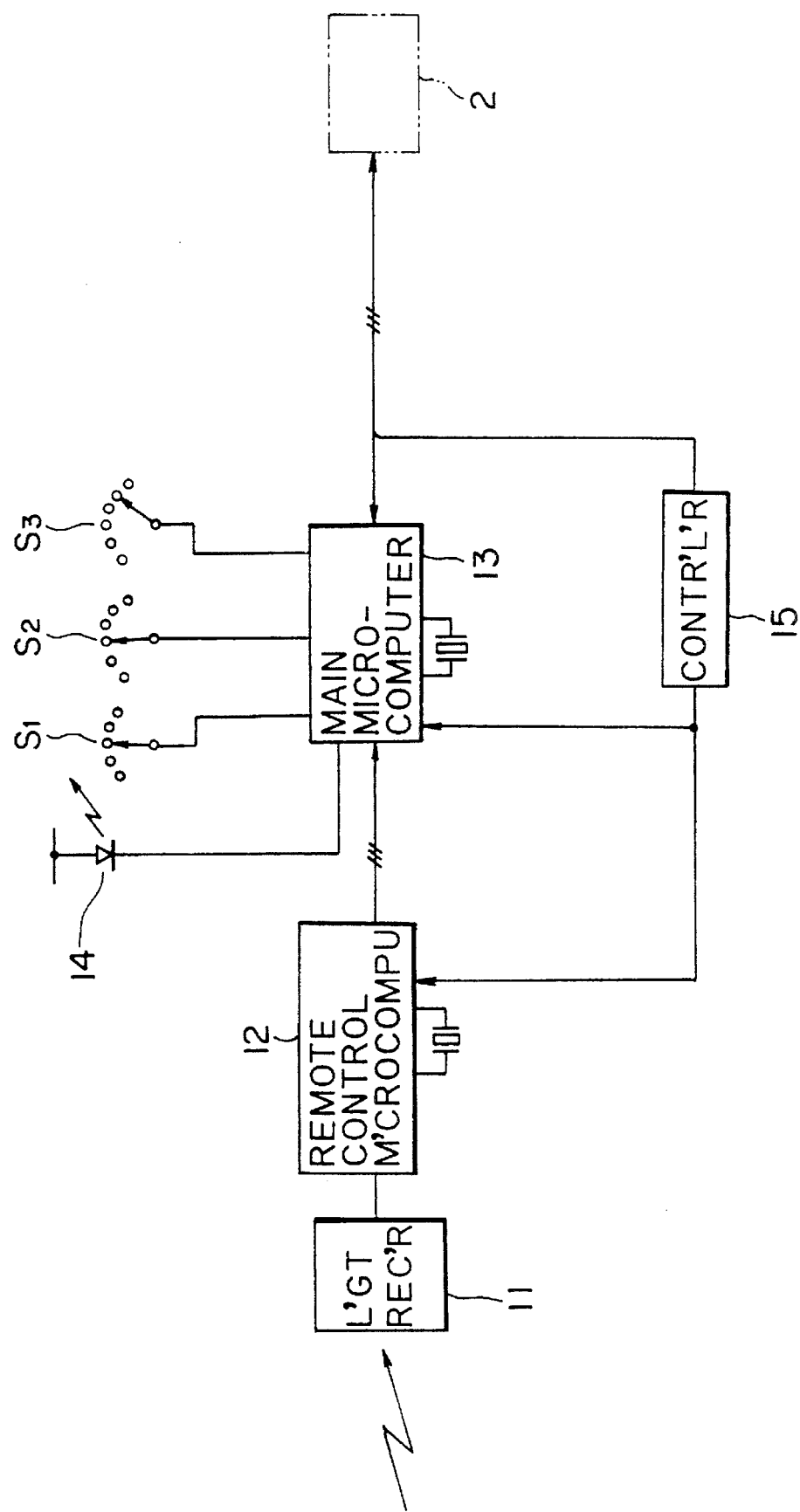
FIG. 3 is a circuit diagram of a remote control receiver for use with the video camera of FIG. 1.

Referring now to FIG. 3, there is shown an example of an electric circuit of the remote control receiver 10. The electric circuit shown includes a light receiving section 11, a remote control microcomputer 12, a main microcomputer 13, a mode indicating LED (light emitting diode) 14, a controller 15 for controlling the microcomputers 12 and 13 in response to a signal from the camera body 2, and three time interval switches S1, S2 and S3. The light receiving section 11 to projects from an upper face of the remote control receiver 10 while the time interval switches S1, S2 and S3 project from a side face of the remote control receiver 10 as shown in FIGS. 1 and 2. The time interval switch S1 is actuable for causing recording, for example, for one second in three minutes. The time interval switch S2 is actuable for causing recording, for example, for one second in 10 minutes while the time interval switch S3 is actuable for causing recording, for example, for one second in 30 minutes. The remote control receiver 10 is adapted to be connected to a remote terminal (not shown) provided on the camera body 2 by way of a connecting cord 16 and a plug 16a at the free end or the connecting cord 16. It is to be noted that a self timer switch for starting recording upon the lapse of a preset interval of time (minutes) may be provided on the remote control receiver 10 in addition to the time interval switches S1. S2 and S3.

Referring back to FIGS. 1 and 2, it will be seen that a rear portion of the remote control receiver 10 is formed as a battery receiving section 17. The battery receiving section 17 is formed with a profile similar to that of the battery receiving section 5 formed on the camera body 2 and includes pairs of hook- or L-shaped arresting portions 17a and 17b formed integrally on opposing inner faces of a pair of flange portions 10c and 10d which are integral with and project from the upper and lower end portions of a rear face of the remote control receiver 10. The battery receiving section 17 further includes a positive terminal 18 and a negative terminal 19 in the form of pins extending rearwardly from the rear face of the remote control receiver 10.

A battery 20 is removably attached to the battery receiving section 17 of the remote control receiver 10. Pairs of L-shaped recessed engaging portions 21a and 21b are formed at corner locations of a front face of the battery 20 corresponding to the pairs of arresting portions 17a and 17b of the remote control receiver 10. A pair of metal plates (not shown) in the form of springs are provided at locations of the front face of the battery 20 corresponding to the positive and negative terminals 18 and 19 of the battery receiving section 17. When the battery 20 is to be attached to or removed from the battery receiving section 17 of the remote control receiver 10, the pairs of engaging portions 21a and 21b of the battery 20 are engaged with or disengaged from the pairs of arresting portions 17a and 17b of the battery receiving section 17. Consequently, the battery 20 can be readily attached to or removed from the battery receiving section 17 When the battery 20 is attached to the battery receiving section 17 of the remote control receiver 10, the pair of metal plates in the form of springs on the front face of the battery. 20 are contacted with the positive and negative terminals 18 and 19 of the battery receiving section 17 so that power can be supplied to the camera body 2 and the remote control receiver 10.

It is to be noted that the battery 20 may be either of the rechargeable pack type or the case type in which a plurality of dry cells are installed. Further, the battery 20 can be attached directly to the battery receiving section 5 of the camera body 2 when the remote control receiver 10 is not employed.

A remote control transmitter (commander) 30 is shown in FIG. 2. The remote control transmitter 30 is of the wireless type which can remotely operate the remote control receiver 20 by means of infrared rays. Various operation buttons for recording, reproducing, zooming up, zooming down and so forth are provided on an upper face of the remote control transmitter 30.

Figure 5:
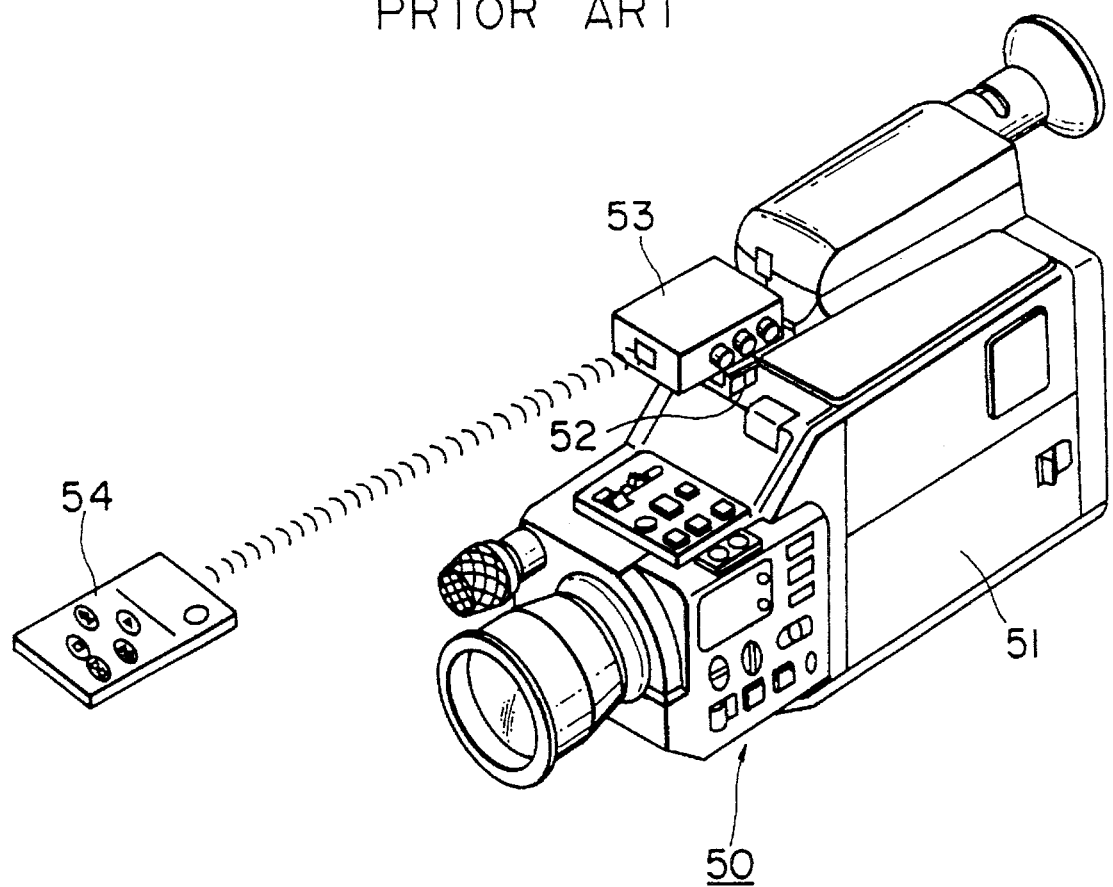
FIG. 5 is a perspective view showing a conventional video camera.

With the video camera 1 of the embodiment described so far, since the remote control receiver 10 is removably attached to the battery receiving section 5 provided on the camera body 2 while the battery receiving section 17 for removably receiving the battery 20 thereon is provided on the remote control receiver 10, the remote control receiver 10 can be readily attached removably to the battery receiving section 5 even when the video camera 1 does not have a shoe, as at 52 on FIG. 5, for the mounting of an attachment on the camera body thereof. Power can thus be supplied to the camera body 2 and the remote control receiver 10 from the battery 20 which is attached to the battery receiving section 17 of the remote control receiver 10. Consequently, the video camera 1 can be remotely operated by operating the remote control receiver 10 thereof by way of the remote control transmitter 30.

Further, since the remote control receiver 10 is attached to the battery receiving section 5 of the camera body 2 and the battery 20 is attached to the battery receiving section 17 of the remote control receiver 10, the remote control receiver 10 is held between and integrated with the camera body 2 and the battery 20 as seen in FIG. 2. Consequently, the video camera 1 has an overall configuration that is substantially the same whether or not the remote control receiver 10 is attached thereto. Thus, the mounting of the remote control receiver 10 between the camera body 2 and the battery 20 does not make a regular user the video camera 1 feel unfamiliar therewith, and an integrated design feeling can be obtained with the video camera 1.

Figure 4:
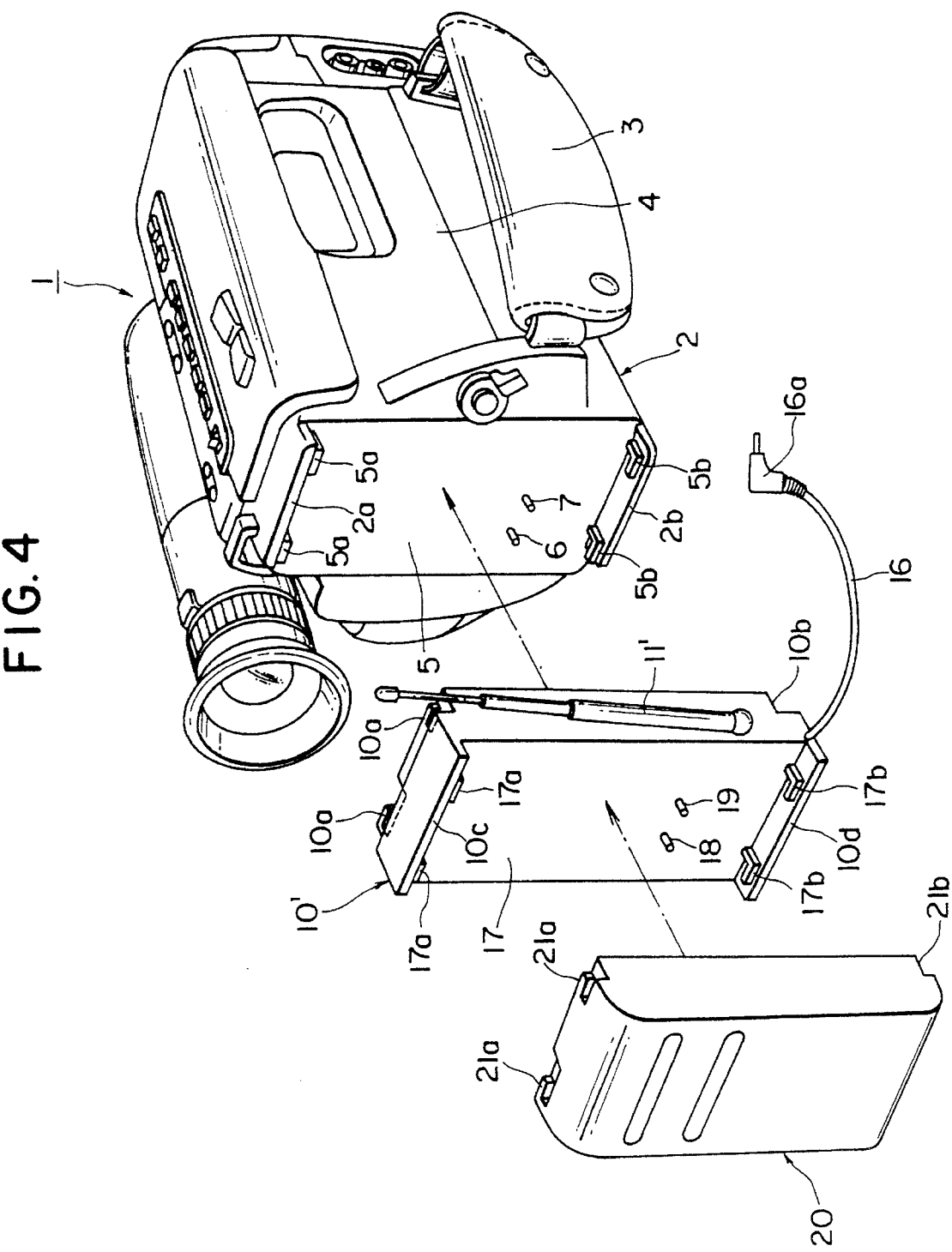
FIG. 4 is an exploded perspective view of a modification to the video camera of FIG. 1.

Referring now to FIG. 4, there is shown a video camera according to the invention which differs from the video camera of the embodiment described above only in that a modified remote control receiver 10' is provided for the remote operation of the camera by means of radio waves. The remote control receiver 10' functions either a tuner or the like and can be removably attached to the battery receiving section 5 provided on the camera body 2 so as to be interposed between the battery 20 and the camera body 2 of the video camera 1. An antenna 11' for the reception of radio waves is provided on a side face of the remote control receiver 10'. The modified video camera, of FIG. 4 can attain effects similar to those described above with reference to the video camera of FIGS. 1–3.

It is to be noted that, while the video cameras of the embodiment and the modification described above are each formed as an 8 mm video camera, the present invention can naturally be applied to any other video camera.

Having now fully described the invention, it will be apparent to one of ordinary skill in the art that many changes and modifications can be made thereto without departing from the spirit and scope of the invention as set forth herein.

What is claimed is:

1. A video camera comprising a camera body having a rear surface, first battery receiving means provided on said rear surface of the camera body, a battery unit from which power is to be supplied to said camera body, said battery unit having a front surface adapted to mate with said rear surface of the camera body and having first coupling means for releasable engagement with said first battery receiving means when said battery unit is mounted directly on said camera body, a removable remote control receiver having first and second opposed surfaces which are substantially coextensive and respectively adapted to mate with said rear surface of the camera body and said front surface of the battery unit, said removable remote control receiver further having a peripheral surface extending between said first and second opposed surfaces so as to be substantially contiguous with outer surfaces of said camera body and said battery unit when said remote control receiver is interposed between said camera body and said battery unit, radiant signal receiving means integral with said removable remote control receiver and being permanently disposed at said peripheral surface for receiving a radiant energy wave signal from a remote control transmitter, second battery receiving means on said removable remote control receiver at said second surface of the latter for releasable engagement with said first coupling means when said remote control receiver is removably interposed between said camera body and said battery unit, second coupling means on said removable remote control receiver at said first surface of the latter for releasable engagement with said first battery receiving means when said remote control receiver is removably mounted on said camera body, and power means on said remote control receiver for supplying power from said battery unit to said remote control receiver and, through the latter, to said camera body when said removable remote control receiver is interposed between said camera body and said battery unit.

2. A video camera according to claim 1, wherein said removable remote control receiver further includes cord means for transmitting to said camera body a control signal corresponding to the received radiant energy wave signal.

3. A video camera according to claim 1, wherein said first and second battery receiving means are of substantially similar appearance and construction so as to be interchangeably engageable by said second and first coupling means on said remote control receiver and said battery unit, respectively.

4. A video camera according to claim 3, wherein each of said first and second battery receiving means includes a pair of flanges for holding said remote control receiver or said battery unit therebetween and a plurality of arresting portions provided on said flanges, and each of said second and first coupling means on said remote control receiver and said battery unit has a plurality of engaging portions provided thereon for engaging with said arresting portions to removably attach said remote control receiver or said battery unit to said first or second battery receiving means.

5. A video camera according to claim 1, wherein said remote control receiver contains electrical circuit means for selectively determining a plurality of recording time intervals for the video camera, and control elements for said electrical circuit means projecting from said peripheral surface of the remote control receiver and being actuable for selecting respective ones of said recording time intervals.

6. A video camera according to claim 5, wherein said radiant signal receiving means projects from said peripheral surface of the remote control receiver at a top portion of the latter, and said control elements for the electrical circuit project from said peripheral surface at a side portion of said remote control receiver.

* * * * *